United States Patent
Johnson et al.

(10) Patent No.: US 8,475,747 B1
(45) Date of Patent: Jul. 2, 2013

(54) PROCESSING FISSILE MATERIAL MIXTURES CONTAINING ZIRCONIUM AND/OR CARBON

(75) Inventors: Michael Ernest Johnson, Richland, WA (US); Martin David Maloney, Evergreen, CO (US)

(73) Assignee: U.S. Department of Energy, Washington, DC (US)

( * ) Notice: Subject to any disclaimer, the term of this patent is extended or adjusted under 35 U.S.C. 154(b) by 784 days.

(21) Appl. No.: 12/484,561

(22) Filed: Jun. 15, 2009

Related U.S. Application Data

(60) Provisional application No. 61/061,563, filed on Jun. 13, 2008.

(51) Int. Cl.
  *G21C 19/00* (2006.01)
  *C01G 56/00* (2006.01)

(52) U.S. Cl.
  USPC ............... 423/7; 252/625; 252/636; 252/637; 423/8; 423/9

(58) Field of Classification Search
  USPC .................. 252/500–645; 423/7–10; 376/189
  See application file for complete search history.

(56) References Cited

U.S. PATENT DOCUMENTS

| | | | |
|---|---|---|---|
| 3,012,849 A * | 12/1961 | Horn | 423/4 |
| 3,965,237 A * | 6/1976 | Paige | 423/4 |
| 2003/0156675 A1* | 8/2003 | Venneri et al. | 376/189 |
| 2003/0234223 A1* | 12/2003 | Kuraoka et al. | 210/660 |
| 2007/0290178 A1* | 12/2007 | Baron et al. | 252/643 |
| 2008/0224106 A1* | 9/2008 | Johnson et al. | 252/625 |
| 2010/0314592 A1* | 12/2010 | Bourg et al. | 252/636 |

OTHER PUBLICATIONS

General Atomics & US DOE, "Development Plan for Advanced High Temperature Coated-Particle Fuels", http://nuclear.inl.gov/deliverables/docs/pc-000513_0_rel.pdf, 2003.*
Pereira, Candido. "UREX+ Process Overview." www.ne.doe.gov/pdfFiles/DOENRCUREXSeminar.pdfSimilar, Mar. 26, 2008.*
Del Cul et al. "TRISO—Coated Fuel Processing to Support High-Temperature Gas-Cooled Reactors." http://nuclear.gov/peis/references/RM923_DelCuletal_2002.pdf, p. 1-62, Mar. 2002.*
Minato et al. "Retention of fission product caesium in ZrC-coated fuel particles for high-temperature gas-cooled reactors." J. Nuclear Materials, 279, pp. 181-188, 2000.*

* cited by examiner

*Primary Examiner* — Tri V Nguyen
(74) *Attorney, Agent, or Firm* — Michael J. Badagliacca; John T. Lucas

(57) ABSTRACT

A method of processing spent TRIZO-coated nuclear fuel may include adding fluoride to complex zirconium present in a dissolved TRIZO-coated fuel. Complexing the zirconium with fluoride may reduce or eliminate the potential for zirconium to interfere with the extraction of uranium and/or transuranics from fission materials in the spent nuclear fuel.

10 Claims, 7 Drawing Sheets

US 8,475,747 B1

PROCESSING FISSILE MATERIAL MIXTURES CONTAINING ZIRCONIUM AND/OR CARBON

CROSS REFERENCE TO RELATED APPLICATION

This application claims priority from U.S. Provisional Application Ser. No. 61/061,563 filed Jun. 13, 2008.

STATEMENT REGARDING FEDERALLY SPONSORED RESEARCH OR DEVELOPMENT

The United States Government has rights in this invention, as represented by the U.S. Department of Energy, pursuant to agreement DE-FC01-07NE24502.

FIELD OF THE INVENTION

The present disclosure relates to processing nuclear material. More specifically, the present disclosure relates to the processing of fissile material mixtures containing zirconium and/or carbon and methods and systems for such processing.

BACKGROUND OF THE INVENTION

Nuclear power plants generate spent nuclear fuels (SNF). SNF typically contains uranium, and other radioactive actinide elements such as neptunium, plutonium, americium and curium, radioactive rare earth elements, the radioactive transition metal technetium, as well as radioactive cesium and strontium.

The spent nuclear fuel may be in the form of a fuel kernel or particle and may include a coating, such as a TRISO-coated particle fuel or a TRIZO-coated particle fuel. TRISO is an acronym for TRI-structural, ISOtropic, with the coatings being a buffer, such as low-density pyrolytic carbon, high density pyrolytic carbon (IPyC and OPyC), and silicon carbide (SiC). TRIZO-coated particle fuel is similar to the TRISO-coated particle fuel and includes a thin layer of Zirconium (ZrC) deposited on the kernel and/or in the buffer layer. The coating serves as a miniature pressure vessel that provides containment of radionuclides and gases.

The spent nuclear fuel may be processed to separate reusable transuranics and uranium from the fission products. The TRIZO-coated fuels contain Zirconium (Zr) in the fuel kernel coatings. Zirconium may contaminate the uranium and technetium or the transuranics separated from the TRIZO-coated fuels during processing.

BRIEF SUMMARY OF THE INVENTION

Described herein are methods for processing TRIZO-coated spent nuclear fuels. One method may include removing a fuel compact from a graphite spent TRIZO-coated fuel block, separating carbon fines and silicon carbide from a fuel kernel, dissolving the fuel kernel, separating solids from the dissolved fuel kernel, oxidizing organic acids, complexing zirconium with fluoride, and processing the dissolved fuel kernel using a solvent extraction process to separate fission products from uranium and transuranics. The fuel compact may include at least the carbon fines, the silicon carbide, and the fuel kernel.

Yet another method may include removing a fuel compact from a graphite spent TRIZO-coated fuel block, separating carbon fines and silicon carbide from a fuel kernel, dissolving the fuel kernel, separating solids from the dissolved fuel kernel, oxidizing organic acids, extracting zirconium from the dissolved fuel kernel, and processing the dissolved fuel kernel by at least one or more of the following processes: CCD-PEG, FPEX, TRUEX, and TALSPEAK. CCD-PEG is an acronym for chlorinated cobalt dicarbollide polyethylene glycol. FPEX is an acronym for Fission Product Extraction. TRUEX is an acronym for Transuranic Extraction. TALSPEAK is an acronym for Trivalent Actinide Lanthanide Separations by Phosphorous-reagent Extraction from Aqueous [K] complexes. The fuel compact may include at least the carbon fines, the silicon carbide, and the fuel kernel.

While multiple embodiments are disclosed, still other embodiments of the present invention will become apparent to those skilled in the art from the following Detailed Description, which shows and describes illustrative embodiments of the invention. As will be realized, the invention is capable of modifications in various aspects, all without departing from the spirit and scope of the present invention. Accordingly, the drawings and detailed description are to be regarded as illustrative in nature and not restrictive.

DETAILED DESCRIPTION

The disclosure is directed to methods of processing fissile material mixtures, such as TRIZO-coated particle fuel. In one aspect, the processing method includes the addition of fluoride anions to complex zirconium present in a dissolved TRIZO-coated fuel. The complexing of zirconium with fluoride may prevent, or otherwise reduce the potential of, interference of the UREX (uranium extraction) and TRUEX (TRU, or transuranic extraction) solvent extraction processes by zirconium. The processing method may also include a step for oxidation of organic acids.

In another aspect, the processing method includes a solvent extraction processing step called ZrTcEX (zirconium technetium extraction). The ZrTcEX process may be applied to TRIZO-coated particle fuels that are made from oxides of transuranics (TRU) that do not contain uranium or where uranium recovery is undesirable. The process co-extracts zirconium and technetium from the dissolved TRIZO TRU oxide fuels. If uranium is also present in the TRIZO-coated fuel, uranium is co-extracted with zirconium and technetium. A step for oxidizing the organic acids may also be included in the processing method.

Figure 1:
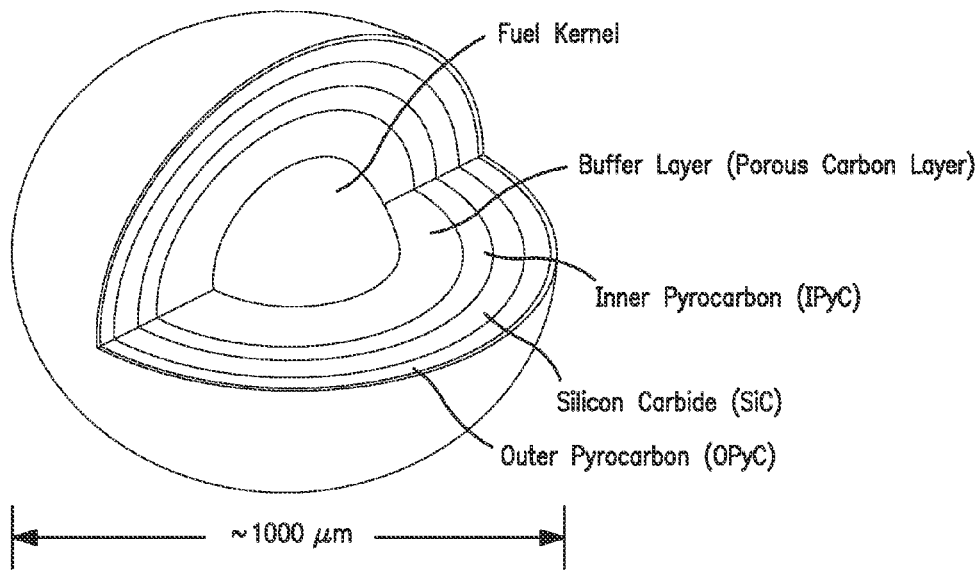
FIG. 1 depicts a coated particle fuel kernel.

With reference to FIG. 1, a coated fuel kernel may include an inner fuel kernel that provides fission energy and controls oxygen potential. TRIZO-coated (and TRISO-coated) fuel kernels can include uranium oxide, mixed uranium and plutonium oxide, plutonium oxide, TRU oxides, or other fissile materials (e.g. thorium). For the TRU oxide fuel, the Pu-239 and Pu-241 content of the TRU functions as the fissile material and the remaining nuclides function as fertile material and/or contribute to reactivity control during burn-up. The inner fuel kernel may be enclosed by several layers of various materials that collectively make up the coating. The layers may include a buffer layer (porous carbon layer), an inner pyrocarbon layer (IPyC), a silicon carbide (SiC) layer and an outer pyrocarbon (OPyC) layer. The buffer layer may provide a void volume for gaseous fission products and CO (carbon monoxide), accommodate swelling of the kernel and attenuate fission recoils. The inner pyrocarbon layer may protect the kernel from chlorine (Cl) during deposition of the silicon carbide layer, reduce tensile stress in the SiC layer and may retain gaseous fission products. The SiC layer may serve as the primary load bearing member and may retain gaseous and metallic fission products. The outer pyrocarbon layer may reduce tensile stress in the SiC layer and retain gaseous fission products, and may protect the SiC layer from a chemical attack by coolant impurities. The buffer, inner pyrolytic carbon (IPyC), silicon carbide (SiC), and outer pyrolytic carbon (OPyC) layers are referred to collectively as a TRISO coating.

Some fuel kernels may include a thin layer of zirconium carbide (ZrC) coating around the kernel which may prevent carbon monoxide (CO) formation. The ZrC coating may prevent the release of fission products from the fuel kernel. ZrC can be substituted in the buffer and SiC layers to allow higher fuel burn-up. Excess oxygen may oxidize the ZrC to form zirconium dioxide ($ZrO_2$). Fuel particles that include the ZrC layer (or multiple layers) around the kernel are referred to as a TRIZO-coated particle fuel.

TRIZO-Coated Fuels Processing

Figure 2:
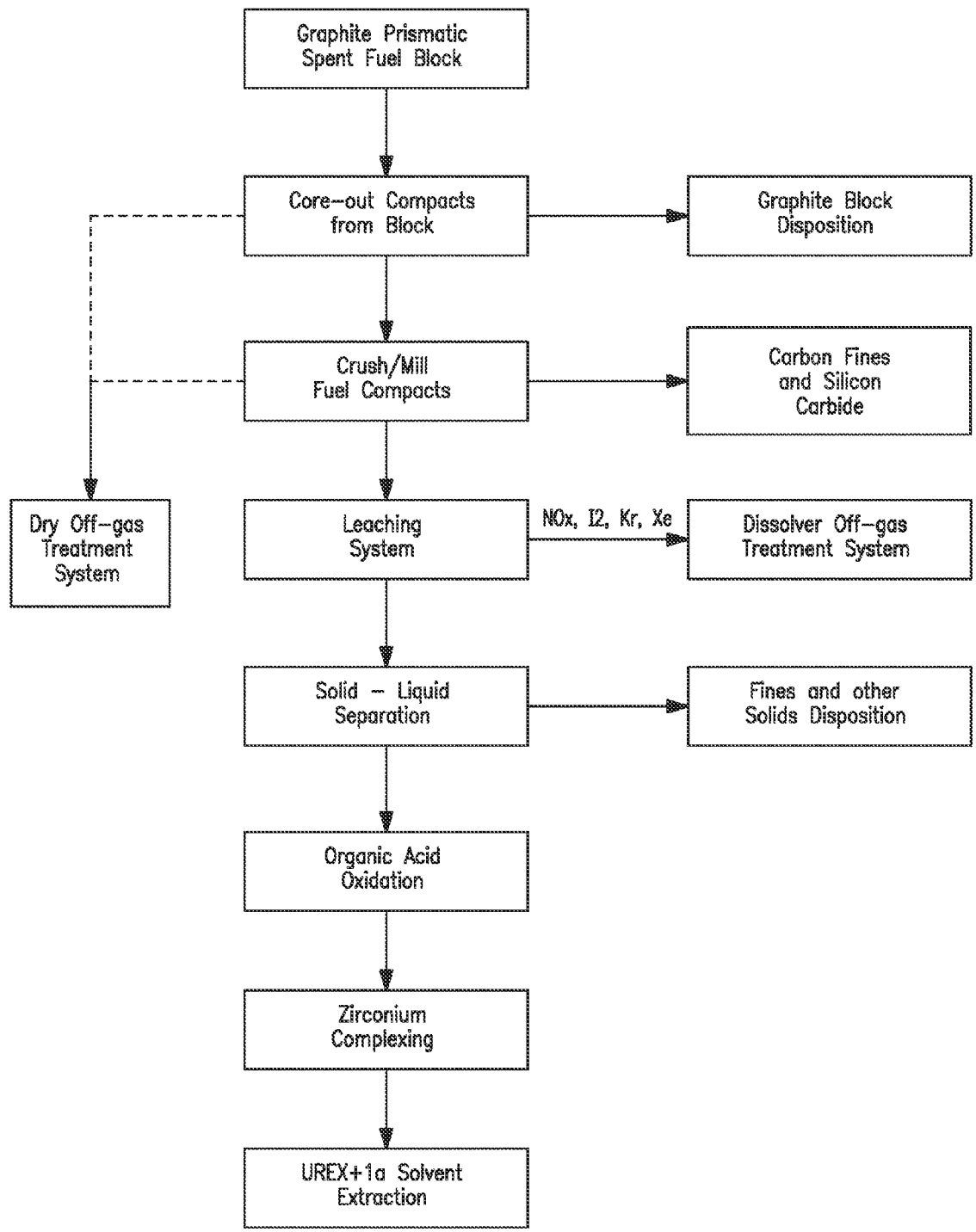
FIG. 2 depicts a flow chart of one embodiment of the steps for processing TRIZO-coated fuels.

As illustrated in FIG. 2, the steps for processing TRIZO-coated fuels may include mechanical and aqueous processing steps. The mechanical processes may include separating the TRIZO-coated fuel from the prismatic blocks and preparing the fuel for aqueous processing. Mechanical processing steps may include separating the fuel compacts from the prismatic blocks, crushing/milling the fuel compacts to separate carbon fines and silicon carbide as well as crush/expose the fuel. The disposition of the solid wastes separated during mechanical processing are discussed in more detail below.

The aqueous processing steps for the TRIZO-coated fuel may include leaching the crushed fuel kernels, separating solids from the dissolved fuel, oxidizing organic acids, complexing zirconium, and UREX+1a solvent extraction processing to separate fission products from uranium and transuranics. The UREX+1a solvent extraction process is comprised of the UREX, CCD-PEG (or FPEX), TRUEX, and TALSPEAK solvent extraction processes. The aqueous processing steps are described in more detail below. The disposition of gaseous waste generated from the mechanical head-end and fuel dissolvers and the treatment of the dissolver sludges and fission products separated during the UREX+1a solvent extraction process are discussed in more detail below.

Head-End Mechanical Preparation of TRIZO-Coated Fuels

The graphite prismatic blocks are transported from the fuel storage location to a disassembly cell. The compacts are taken out of the graphite block using a drilling method to expose the fuel channels and pressure to push out the compacts. The graphite fines generated from cutting into the graphite block to expose the fuel channel are collected by a vacuum system for disposal. A similar system was developed for extracting irradiated compacts from the Fort St. Vrain HTR reactor prismatic blocks, which used a gunmill cutting tool and a vacuum system to collect graphite powder. This method is described in more detail in WINCO-1159, 1993, *Fort St. Vrain Graphite Fuel Mechanical Separation Conceptual Selection Final Report*, S. M. Berry, Westinghouse Idaho Nuclear Company, Inc., Idaho Falls, Id., which is hereby incorporated herein by reference in its entirety. Also, a similar method was also used to over-bore fuel channels in the graphite blocks in the 105-C reactor at the Hanford Site, Richland Wash. This method is described in more detail in HW-71711, 1962, *Final Report Production Test Number IP-360-AK Over-Boring Demonstration Cast Iron and Graphite Bore Enlargement 105-C*, General Electric Company, Richland Wash., which is hereby incorporated by reference herein in its entirety. The Hanford Site system used a shell end mill tool for cutting the graphite and collected the graphite fines using a vacuum system.

After drilling, the fuel compacts are pushed out of the fuel channels. It has been demonstrated that compacts removal from Fort St. Vrain graphite blocks may be achieved by pushing with an average force of 10.7 $lb_f$ (ranged from 1.5 to 33 $lb_f$). The graphite blocks are removed from the disassembly cell for dispositioning. The compacts are transferred to another cell for size reduction and to minimize contamination in the graphite block disassembly cell. The fuel compacts are further processed for size reduction.

A first method for size reduction of fuel compacts uses grinding and milling. Use of a jaw-type crusher to breakup the fuel compacts has been proposed. Carbonaceous materials are separated from the fuel kernels and disposed. The fuel kernels are processed by jet-milling to produce small size (<50 μm) particles.

A second method for size reduction of fuel compacts uses pulsed current to breakup the fuel compacts and kernels. The fuel compacts are placed in water and are exposed to high voltage/high intensity pulses of 200 to 500 kV, and discharge currents from 10 to 20 kA. The duration of pulses being short, the implemented energy is a few kJ. In these conditions, in the presence of water, an electric arc is created near the solid and propagates preferentially through it. Energy with density ranging from 10 to 100 J/cm is deposited in few microseconds in holes of discharge of less than 10 microns in diameter that induced a temperature increase which can reach up to 10,000° K together with a pressures rise of $10^{10}$ Pa. These extreme conditions split up the solid to reduce it to fine fragments. If the electric arc does not cross the solid material, the electrical energy is transformed into mechanical energy that propagates in the water in the form of a shock wave provoking a similar effect of dismantling. The pulsed current method for size reduction of fuel compacts using nuclear grade graphite samples has been demonstrated. The graphite samples (typically 27×27×40 mm) were fractured into pieces with particle size distribution less than 100 μm using the pulsed current technique. The pulsed current technique may be suitable for either separating the carbonaceous material from the fuel kernels to enable separate disposal or for size reduction of the fuel kernels.

Aqueous Processing of TRIZO-Coated Fuels

TRIZO-coated fuels kernels may include uranium oxide, mixed uranium and plutonium oxide, plutonium oxide, TRU oxides, or other fissile materials (e.g., thorium). The aqueous processing steps for the uranium oxide and the mixed uranium and plutonium oxide fuels are generally similar and are discussed in more detail below. The plutonium oxide and TRU oxides TRIZO-coated fuels contain very little uranium. While these fuels may be processed using the same aqueous processing steps as the uranium containing TRIZO-coated fuels, a method, known as ZrTcEX, described in more detail below takes advantage of the near absence of uranium in these fuels.

Dissolution of Uranium Containing TRIZO-Coated Fuels

The size reduced fuel kernels are leached using a suitable acid such as nitric acid or nitric acid mixed with hydrofluoric acid to dissolve the fuel. Zirconium carbon present in the fuel coatings will dissolve in the acid solution along with the fuel. Additionally, zirconium oxide formed in the TRIZO-coated fuel is also known to dissolve in nitric acid based on dissolution tests of calcined zirconium oxide (INEL-95/0225, 1995, *Actinide Partitioning from Actual ICPP Dissolved Zirconium Oxide Calcine using the TRUEX Solvent*, K. N. Brewer et al., Idaho National Engineering Laboratory, Lockheed Idaho Technologies Company, Idaho Falls Id.). The pyrolytic carbon and silicon carbide coatings, along with carbon fines and noble metals (e.g. rhodium, palladium, etc.) that do not dissolve in the acid are separated from the dissolver solution by filtration. The clarified dissolver solution is then preconditioned for UREX+1a solvent extraction processing.

Preconditioning of the clarified dissolver solution may include decomposing organic acids and complexing zirconium. In one embodiment, the dissolution step includes the use of a composition including hydrogen fluoride (HF) and nitric acid ($HNO_3$). If such a composition is used, addition of fluoride, as described herein, may not be necessary. As discussed in the section entitled Organic Acid Oxidation, organic acid decomposition may reduce interference with UREX+1a solvent extraction steps. Following decomposition of the organic acids, fluoride may be added to the TRIZO-coated fuel dissolver solution to complex zirconium, reduce or prevent interference during uranium solvent extraction (UREX), and enable zirconium stripping during the transuranics and lanthanide (TRUEX) solvent extraction process, as discussed in section entitled Zirconium Complexing. The preconditioned dissolver feeds are reacted with a reductant/complexant (acetohydroxamic acid) to reduce the valence state and hinder the extractability of plutonium and neptunium. The solution is then fed to the UREX+1a solvent extraction process. The UREX+1a process consists of four solvent extraction processes: UREX, CCD-PED (or FPEX), TRUEX, and TALSPEAK, which are described further in the section entitled UREX+1A Solvent Extraction Process for Uranium Containing Solutions.

Acetohydroxamic acid (AHA) is added in the UREX process to suppress plutonium extraction and prevent the retention of certain problematic fission products (e.g., Mo, Zr, and Ru) by the tributyl phosphate (TBP) solvent. The degree to which AHA forms complexes with zirconium under conditions experienced during processing TRIZO-coated fuels is not known and the effectiveness of preventing zirconium extraction by TBP is uncertain. If AHA proves suitable to complex zirconium and prevent extraction by TBP, then fluoride would not be added to the dissolver solution. Instead, fluoride would be added after the AHA had been decomposed in the TRUEX feed preparation step to complex zirconium and prevent co-extraction with the actinides and lanthanides.

Organic Acid Oxidation

The presence of carbon during dissolution of uranium can result in the formation of oxalic acid and mellitic acid, as well as potentially other organic acids. The organic acids can interfere with the extraction of uranium (or other elements) in solvent extraction systems. The effect of organic acids on solvent extraction systems similar to the UREX process are discussed in the next section. Oxidation of these organic acids may avoid unwanted effects during solvent extraction processing and is discussed in more detail below.

Organic Acids Effects on Solvent Extraction Systems

Experiments have been conducted to determine the reactions of uranium mono- and di-carbides with 2 to 16M nitric acid at 20 to 120° C. Crushed uranium carbide samples were dissolved with nitric acid and uranium extraction was conducted by equilibrating the solution with 20% TBP in 80% Amsco solvent, an odorless kerosene-like diluent. Little or no extraction of the organic species was observed. Organic species as solids were recovered by evaporating the raffinate from the solvent extraction tests to dryness. Of the original carbide carbon present, 50 to 70% was converted to carbon dioxide and 21 to 44% converted to oxalic acid dihydrate, mellitic acid, and other soluble organic acids when uranium carbide was dissolved in 4 to 16M nitric acid. The effect or lack thereof of the organic acids on uranium extraction by TBP was not reported. (*Reactions of the Uranium Carbides with Nitric Acid*, 1965, J. Am. Chem. Soc., Vol. 87, pp 1710-1714, L. M. Ferris and M. J. Bradley, Oak Ridge National Laboratory, Oak Ridge Tenn.)

During PUREX (an acronym for Plutonium Uranium Extraction) process tests with uranium carbide dissolved in nitric acid, and in the presence of zirconium, an unknown zirconium organic complex formed that could not be scrubbed from the 30% TBP in normal paraffin hydrocarbon solvent. Uranium extraction was not reported as being effected by the presence of organic acids. Treatment of the dissolved uranium carbide solution with an oxidizing agent destroyed the zirconium organic species and allowed effective zirconium scrubbing from the PUREX solvent. The organic acids were shown to be effectively oxidized with dichromate and cerium (IV). The process conditions tested were oxidation at 50° C. for 24-hours using 0.002M dichromate, 0.02M dichromate, or 0.005M cerium (IV) added to dissolver solution containing 1.8M uranium and 0.5M nitric acid. Hydrogen peroxide was reported to be effective in oxidizing the organic acids, though to a lesser extent. However, no specific process conditions were reported in the reference for the hydrogen peroxide tests. (BNWL-1573, 1971, *Improved Zirconium Decontamination in PUREX Process*, page 16, J. L. Swanson, Battelle Pacific Northwest Laboratories, Richland Wash.)

Processing the High Temperature Gas-Cooled Reactor (HTR) fuels in either the THOREX or PUREX solvent extraction processes has also been investigated. Fuel elements containing graphite of the HTR's may require a head-end procedure which is more laborious than for metal clad fuel. Generally, the head-end procedure may not affect the aqueous chemical process because following dissolution, the history of the fuel has almost completely disappeared. However, if too much carbon remains in the fuel after the graphite is burned off (viz. more than 0.1% carbon in the ash), problems may be encountered in the solvent extraction. Oxalic acid may be produced by the reaction of $HNO_3$ with graphite. Because oxalic acid may form complexes with plutonium, a satisfactory plutonium recovery from the extraction step may not occur. (*Chemical Processing of HTR Fuels Applying Either THOREX or PUREX Flow Sheets*, 1983 International Atomic Energy Agency, International Working Group on Gas-Cooled Reactors, Vienna (Austria); State Committee on the Utilization of Atomic Energy of the USSR, Moscow (Russian Federation) IWGGCR-8, pp: 333-344, E. Zimmer and E. Merz, Kernforschungsanlage Juelich GmbH, Institut fuer Chemische Technologie der Nuklearen Entsorgung, Juelich, Germany.)

The potential formation of mellitic acid during dissolution of crushed TRISO-coated fuel surrogates that contained carbon has been reported (*Processing of Spent TRISO-Coated GEN IV Reactor Fuels*, 2004, Actinide and Fission Product Partitioning & Transmutation Eighth Information Exchange Meeting Las Vegas, Nev., USA 9-11 Nov. 2004, B. B. Spencer, C. H. Mattus, G. D. Del CuI, D. Hunt and E. D. Collins, Oak Ridge National Laboratory, Oak Ridge Tenn.). Batch mixing tests to measure uranium extraction with TBP were conducted. While some of the crushed TRISO-coated fuel surrogates contained zirconium, measured or calculated zirconium distribution coefficients with the TBP were not reported. Such a result may be because an organic acid was extracted into the organic (TBP) phase and enhanced uranium extraction based on tests conducted with and without carbon being present during dissolution of the crushed TRISO-coated fuel surrogates. No physical, mechanical, foam, or emulsion issues were encountered during the batch mixing tests. The organic acid species could effect the extraction behavior of the solvent if it accumulates over time.

Oxidation of Organic Acids

The preceding section describes some potential negative impact organic acids may have on solvent extraction processes for separating uranium or transuranics including interference with extraction, accumulation of organic acids in solvent, and zirconium complexing. Oxidation of the organic acids appeared to be effective in destroying the organic species that were complexing zirconium and preventing effective scrubbing from uranium extracted with 30% TBP solvent. The organic acids were shown to be effectively oxidized with dichromate and cerium (IV). The process conditions tested were oxidation at 50° C. for 24-hours using 0.002M dichromate, 0.02M dichromate, or 0.005M cerium (IV) added to dissolver solution containing 1.8M uranium and 0.5M nitric acid. The use of the higher dichromate concentration did not appear to significantly enhance the zirconium scrubbing from the 30% TBP solvent. Hydrogen peroxide was reported to be effective in oxidizing the organic acids, though to a lesser extent. However, no specific process conditions were reported for the hydrogen peroxide tests.

While the concentration of the dichromate and cerium (IV) used to oxidize the organic acids was relatively low, it may not be desirable to introduce additional metal cations in the UREX+1a solvent extraction process. In particular, the use of dichromate and cerium (IV) to oxidize organic acids may increase the mass of high-level waste generated during processing of TRIZO-coated fuels. Dichromate is known to oxidize plutonium (IV) to plutonium (VI) in nitric acid, which was used in the bismuth phosphate precipitation process to recover plutonium and in the REDOX (an acronym for Reduction Oxidation) solvent extraction process to co-extract plutonium (VI) and uranium (VI), but not in the PUREX solvent extraction process Co-extraction of plutonium along with uranium in the UREX solvent extraction process may be undesirable. Cerium is difficult to separate from the transuranics in the TALSPEAK solvent extraction process and will similarly oxidize plutonium (IV) to plutonium (VI) in nitric acid. The UREX process does include addition of a reductant/complexant (0.47 M acetohydroxamic acid and 0.3 M $HNO_3$) to reduce the valence state and limit the extractability of plutonium and neptunium, and additional reductant would be required if either dichromate or cerium (IV) were added to oxidize organics in the processing of TRIZO-coated fuels. Hydrogen peroxide is known to react with various organic acids in nitric acid, including oxalate and citrate. Hydrogen peroxide is also known to reduce plutonium (VI) to plutonium (IV) in nitric acid. Plutonium (IV) is further reduced to plutonium (III) in the presence of hydrogen peroxide and nitric acid, but oxidizes back to plutonium (IV) once the hydrogen peroxide is depleted. The reactions of hydrogen peroxide with organic acids (or plutonium) present in the dissolved TRIZO-coated fuel results in the formation of water, carbon dioxide, and smaller chain organics. Therefore, the addition of hydrogen peroxide to oxidize organic acids appears to have the least effect on the UREX+1a solvent extraction process and, in one embodiment, is the oxidizing reagent used in the process.

The oxidization of organic acids present in nitric acid dissolved TRIZO-coated fuels with hydrogen peroxide is now discussed. For development of a preliminary flowsheet, it is conservatively assumed that 44% of the original carbide carbon present is converted to organic acids and one mole of hydrogen peroxide reacts with one mole of organic carbon. Furthermore, one mole of hydrogen peroxide is assumed to react with one mole of plutonium as a result of the aforementioned plutonium oxidation and reduction reactions. The oxidation of organic acids with hydrogen peroxide is assumed to be conducted at 50° C. for 24-hours.

Zirconium Complexing

Although other aqueous processes for separating uranium and transuranic elements from spent nuclear fuel (SNF) are available, the following discussion refers to the UREX+1a process. However, other processes may be utilized.

The UREX+1a process is a series of four solvent-extraction flow sheets that perform the following operations: (1) recovery of Tc and U (UREX), (2) recovery of $^{137}Cs$ and $^{90}Sr$ fission products (CCD-PEG or FPEX), (3) transuranics and rare earths separation from non-rare-earth (TRUEX), and (4) separation of transuranic elements from the rare earths (TALSPEAK).

The TRIZO-coated fuels may contain a significant inventory of Zr present in the fuel kernel coatings. Zirconium may contaminate the uranium and technetium or the transuranics separated from the TRIZO-coated fuels during UREX+1a processing. The following subsections discuss the impact of zirconium on the UREX, CCD-PED (or FPEX), TRUEX, and TALSPEAK solvent extraction processes, as well as a method for complexing zirconium.

Zirconium Behavior in UREX Process

The zirconium distribution coefficient is less than 0.01 for process conditions experienced in the UREX uranium and technetium separation process when the tributyl phosphate (TBP) solvent (30% TBP in n-dodecane) is highly saturated with uranium as experienced when processing light water reactor (LWR) fuels. Furthermore, the UREX process adds acetohydroxamic acid (AHA) to the feed to the extraction section and in the scrub section to suppress plutonium extraction and prevent the retention of certain problematic fission products (e.g., Mo, Zr, and Ru) by the TBP solvent that would otherwise contaminate the uranium and technetium product streams. The TRU oxide TRIZO-coated fuel does not contain a significant mass of uranium, therefore the TBP solvent in the UREX process will not be saturated with uranium when processing these fuels. Again, AHA is added to the feed to the extraction and scrub sections to suppress plutonium extraction and hinder zirconium extraction.

Zirconium extraction tests conducted with 30% TBP in normal paraffin hydrocarbon (similar to n-dodecane) for the PUREX process have demonstrated that zirconium can be complexed with fluoride and effectively scrubbed from the solvent. Additional testing (as described more below in the section entitled Zirconium Behavior in TRUEX Process) has shown that zirconium complexed with fluoride results in the uranium product being free from zirconium in the UREX process. Therefore, zirconium complexed with fluoride will be minimally extracted by the UREX TBP solvent and can readily be scrubbed. Zirconium and fluoride will report to the raffinate stream from the UREX process.

As previously noted, AHA is added in the UREX process to suppress plutonium extraction and hinder the retention of certain problematic fission products (e.g., Mo, Zr, and Ru) by the TBP solvent. The degree to which AHA forms complexes with zirconium under conditions experienced during processing TRIZO-coated fuels is not known and the effectiveness of preventing zirconium extraction by TBP is uncertain. If AHA proves suitable to complex zirconium and prevent extraction by TBP, then fluoride would not be added to the dissolver solution. Instead, fluoride would be added after the AHA had been decomposed in the TRUEX feed preparation step to complex zirconium and prevent co-extraction with the actinides and lanthanides.

The presence of carbon during dissolution of uranium can result in the formation of oxalic acid and mellitic acid, as well as potentially other organic acids. PUREX process tests with uranium carbide dissolved in nitric acid resulted in a formation of some zirconium organic species that could not be scrubbed from the 30% TBP in normal paraffin hydrocarbon solvent. However, treatment of the dissolved uranium carbide solution with an oxidizing agent destroyed the zirconium organic species and allowed effective zirconium scrubbing from the PUREX solvent. An organic acid oxidation step may be included in the UREX+1a process when processing TRIZO-coated fuels to destroy the zirconium organic species and allow effective zirconium scrubbing from the UREX solvent.

Zirconium Behavior in CCD-PEG (or FPEX) Process

The raffinate stream from the UREX process will contain the spent fuel components except for uranium and technetium. The UREX process raffinate is fed to the extraction section of the CCD-PEG (or alternatively the FPEX) process. The CCD-PEG solvent is a mixture of 0.011 M chlorinated cobalt dicarbollide (CCD) and 0.027 M polyethylene glycol (PEG-400) in phenyl-trifluoromethyl sulfone (FS-13). The alternative FPEX process uses a solvent composed of 0.0075 M 4,4',(5')-Di(t-butyldicyclo-hexano-)-18-crown-6 (DtBuCH18C6), 0.007 M Calix[4]arene-bis-(tertoctylbenzo-crown-6) (BOBCalixC6), 0.75 M 1-(2,2,3,3-tetrafluoropro-poxy)-3-(4-sec-butylphenoxy)-2-propanol) (Cs-7SB), and 0.003 M trioctylamine (TOA) in Isopar® L. Alternative solvent mixtures may be employed to accomplish the extraction of cesium and strontium. The behavior of zirconium in the CCD-PEG (or FPEX) process is not known and requires further study. However, zirconium will likely not remain in the CCD-PEG (or FPEX) solvent following scrubbing. The CCD-PEG (and FPEX) solvent is a highly specific extractant for cesium, strontium, and few of the other group IA (e.g. rubidium) and IIA (e.g. barium) cations. Therefore, the scrub section of the CCD-PEG (or FPEX) process should contain transuranics, lanthanides, zirconium, and other fission products, which are fed to the TRUEX process.

Zirconium Behavior in TRUEX Process

The transuranics and the rare earth elements are extracted by the TRUEX solvent, which is 0.2 M octyl (phenyl)-N,N-diisobutylcarboylmethyl-phosphine oxide (CMPO) and 1.4 M TBP diluted by n-dodecane. Lesser amounts of other fission products (e.g., $^{95}$Zr and $^{90}$Y) are also extracted and may be scrubbed from the solvent so as not to contaminate the transuranics. The TRUEX process employs three scrub steps. In the first scrub step, the impurities are removed from the solvent using oxalic acid mixed with nitric acid. The second scrub step uses moderately concentrated nitric acid to scrub oxalic acid from the solvent. The third scrub step uses relatively dilute nitric acid to lower the nitric acid concentration in the solvent to allow effective stripping. The third scrub step uses a weak complexant salt (lactic acid with diethylenetri-aminepentaacetic acid) to strip the transuranics and rare earth elements from the solvent.

The TRUEX solvent may extract zirconium in sufficient quantities that can hinder the desired extraction of transuranics and lanthanides. Testing of the TRUEX process has been conducted in order to separate transuranics from: (1) actual zirconium oxide calcine that was dissolved in nitric acid; (2) simulated dissolved zirconium oxide calcine spiked with $Am^{241}$ and $Zr^{95}$; and (3) simulated sodium bearing waste, a nitric acid solution containing zirconium fission products, uranium and transuranics. Table 1 shows the composition of the dissolved solutions used in TRUEX process tests. The TRUEX process tests with the sodium bearing waste demonstrated about 60% of the zirconium in the feed would remain with the transuranics. Similar TRUEX process tests conducted with dissolved zirconium oxide calcine demonstrated that 99% of the zirconium in the feed would remain with the transuranics.

The TRUEX process has also been tested for extracting transuranics from a zirconium cladding waste (referred to as NCRW) sludge that was dissolved in nitric acid. The NCRW sludge contains sodium, zirconium, uranium, actinides, lanthanides, aluminum, silicon, iron, chromium, as well as fission products (e.g. $^{144}$Ce, $^{134}$Cs, $^{137}$Cs, $^{154/155}$Eu, $^{125}$Sb, $^{90}$Sr, $^{99}$Tc, $^{60}$Co). The NCRW sludge was generated as a result of dissolving the Zircaloy-cladding on metallic uranium fuel in a PUREX plant. The dissolution process dissolved the Zircaloy-cladding as well as a small fraction of the metallic uranium fuel. Tests were conducted to dissolve the NCRW sludge using a mixture of nitric acid and hydrofluoric acid and process the dissolved waste solution using the TRUEX process. Table 1 also provides the composition of dissolved NCRW sludge used in these TRUEX process tests. Uranium was first separated from the dissolved NCRW sludge using 30% TBP in n-dodecane as process conditions similar to those used in the UREX process. The uranium product from the 30% TBP in n-dodecane solvent did not appear to contain zirconium. Transuranics were separated using the TRUEX process.

TABLE 1

Composition of Wastes used for TRUEX Process Tests

| Component (M) | Actual Dissolved Zirconium Calcine | Simulated Dissolved Zirconium Calcine | Simulated Sodium Bearing Waste | Dissolved NCRW Sludge |
|---|---|---|---|---|
| H | 2.58 | 3.4 | 1.31 | 2.2 |
| NO3 | 4.33 | 6.4 | 4.46 | 2.2 |
| Al | 0.72 | 0.49 | 0.563 | 0.034 |
| Ca | 0.57 | 0.78 | 3.39E−02 | |
| Ce | | | 3.63E−04 | |
| Cl | | | 3.52E−02 | |
| Cr | 2.6E−03 | 5.4E−03 | 5.63E−03 | |
| Cs | | | 6.52E−05 | |
| F | 0.64 | 1.2 | 9.66E−02 | 0.96 |
| Fe | 0.01 | 0.015 | 2.45E−02 | |
| Hg | | | 1.17E−03 | |
| K | 0.02 | | 0.141 | |
| Mn | | | 1.42E−02 | |
| Na | 0.20 | 0.012 | 1.17 | 0.19 |
| Ni | | | 1.63E−03 | |
| Nd | | | 3.71E−03 | |
| Pb | | | 9.8E−04 | |

TABLE 1-continued

Composition of Wastes used for TRUEX Process Tests

| Component (M) | Actual Dissolved Zirconium Calcine | Simulated Dissolved Zirconium Calcine | Simulated Sodium Bearing Waste | Dissolved NCRW Sludge |
|---|---|---|---|---|
| Sr |  |  | 5.28E−04 |  |
| SO4 |  |  | 3.86E−02 |  |
| Zr | 0.066 | 0.23 | 7.7E−05 | 0.22 |
| U | 2.69E−03 (gm/L) |  |  | 0.014M |
| Ci/L |  |  |  |  |
| Cs-137 | 0.23 |  |  |  |
| Am-241 | 1.25E−04 |  |  | 2.8E−04 |
| Pu-238 | 1.3E−03 |  |  |  |
| Pu-239 | 5E−05 |  |  | 2.8E−04 |

Note:
Blanks in table indicate no data available for these elements

The TRUEX process tests with dissolved NCRW sludge demonstrated that zirconium could form a separate solid phase in the TRUEX process under specific conditions. However, the formation of zirconium solids could be eliminated by adjusting the F/(Al+Zr) ratio to 3.8 in the dissolved NCRW solution. Aluminum is present to complex fluoride and act as a corrosion inhibitor for stainless steel equipment. Additionally, the fluoride ion formed a stable complex with zirconium and reduced the zirconium distribution coefficient in the TRUEX solvent, thus enabling scrubbing of zirconium from the transuranics. Transuranics and lanthanides were then stripped from the TRUEX solvent. For the NCRW TRUEX process, the zirconium fluoride complex was scrubbed from the TRUEX solvent using 0.15M oxalic acid scrub. Extracted oxalic acid was scrubbed from the TRUEX solvent using 5M nitric acid, and excess nitric acid was scrubbed from the solvent using 0.01M nitric acid. These scrub solutions are the same scrub solutions used in the UREX+1a TRUEX process.

Zirconium Behavior in TALSPEAK Process

The discussion above demonstrates that zirconium, when not complexed, interferes with the extraction and stripping of transuranics and lanthanides in the TRUEX process. However, adding fluoride to the dissolved TRIZO-coated fuel will form a stable zirconium fluoride complex which then can be scrubbed from the TRUEX solvent prior to stripping of transuranics and lanthanides. The transuranics and lanthanides can then be separated in the TALSPEAK process without minimal to none zirconium contamination present in the transuranics.

UREX+1a Solvent Extraction Process for Uranium Containing Solutions

The preconditioned dissolver feeds are reacted with AHA to complex/reduce plutonium and neptunium, thereby limiting their extraction by tributyl phosphate in the UREX process. The solution is then fed to the UREX+1a solvent extraction process. The UREX+1a process is a series of four solvent-extraction flow sheets that perform the following operations: (1) recovery of Tc and U (UREX), (2) recovery of $^{137}$Cs and $^{90}$Sr fission products (CCD-PEG or FPEX), (3) transuranics and rare earths separation from non-rare-earth (TRUEX), and (4) separation of transuranic elements from the rare earths (TALSPEAK). The processing of TRIZO-coated fuels using these four solvent extraction processes is described in the following subsections.

UREX: Uranium and Technetium Separation

Figure 3:
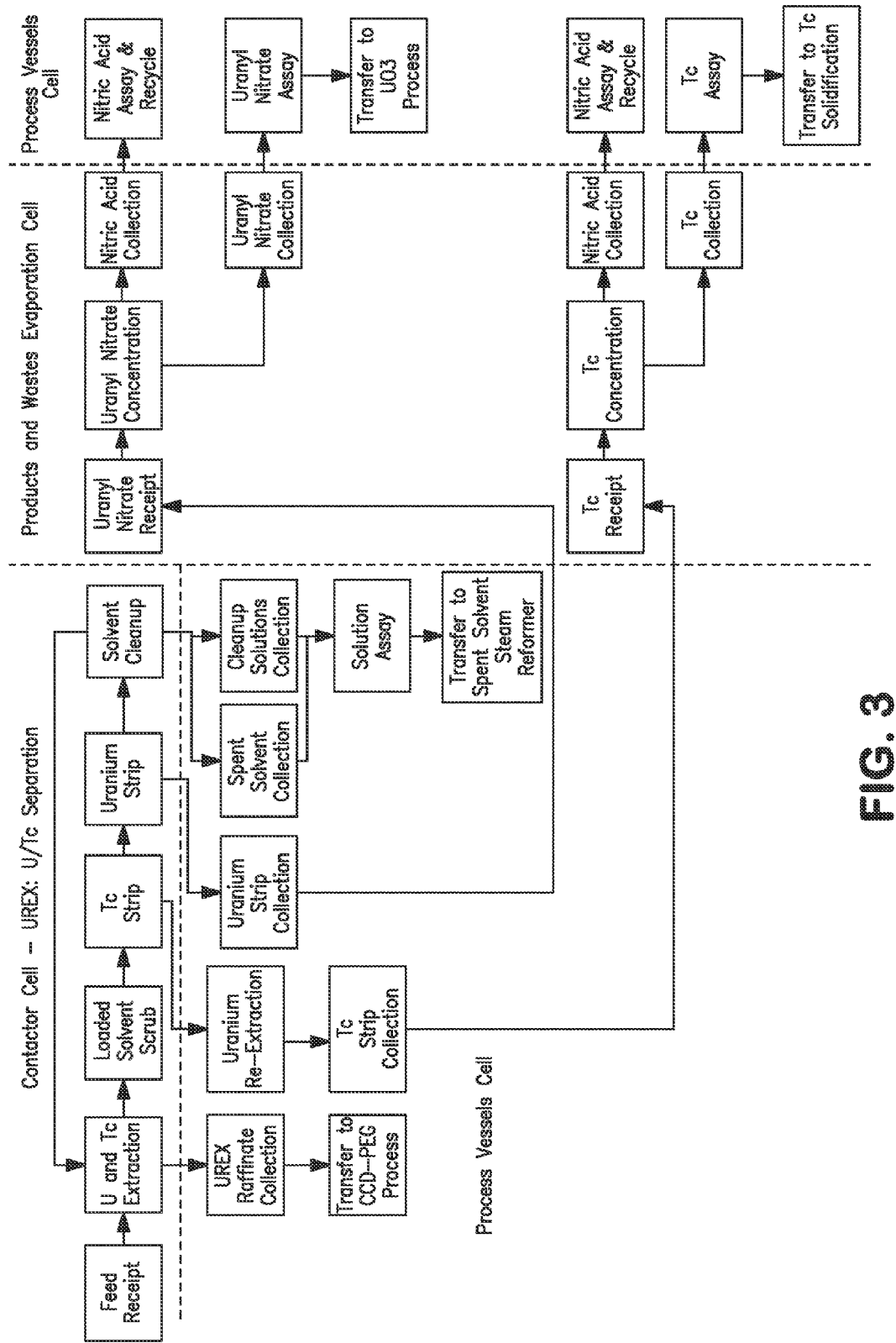
FIG. 3 depicts a functional flow diagram for the UREX process.

FIG. 3 depicts a functional flow diagram for the UREX process. The UREX process separates the transuranics and mixed fission products from uranium and technetium present in the dissolved SNF. Technetium is subsequently separated from uranium to enable recycle of uranium and disposal of the technetium. The transuranics and mixed fission products are then fed to the CCD-PEG (or FPEX) process for further treatment.

Similar to the solvent used in the PUREX process, the solvent for the UREX process is tributyl phosphate (TBP) dissolved in n-dodecane. A reductant/complexant (which may be 0.47 M AHA and 0.3 M HNO$_3$) is added to the process through the scrub to limit the extractability of plutonium and neptunium. The feed and the scrub contain low concentrations of nitric acid to enhance the complexation of Pu and Np and to increase the extractability of pertechnetate ion. AHA also hinders the retention of certain problematic fission products (e.g., Mo, Zr, and Ru) by the TBP solvent that may otherwise contaminate the uranium and technetium product streams.

Turning now to the UREX process, the uranium and technetium in the feed are extracted into the solvent in the extraction section while other extractible species are scrubbed from the solvent in the scrub section. The solvent, now loaded with uranium and technetium, is stripped of technetium in the Tc-Strip section using 6 M nitric acid. The Tc product stream is scrubbed of uranium in the U-Re-extraction section. The combined solvent enters the U-Strip section, where a dilute (0.01 M) nitric acid feed removes uranium from the solvent. The solvent is then washed with 0.25 M sodium carbonate solution to remove degradation products and contacted with 0.1 M nitric acid to acidify the solvent before recycling the solvent to the front end of the process.

The uranium recovered in the UREX process can be returned to the fuel manufacturing process for recycle or discarded as waste. Technetium separated in the UREX process can be made into a waste form for disposal as high-level waste or used in other manufacturing processes.

CCD-PEG: Cs/Sr Extraction

Figure 4:
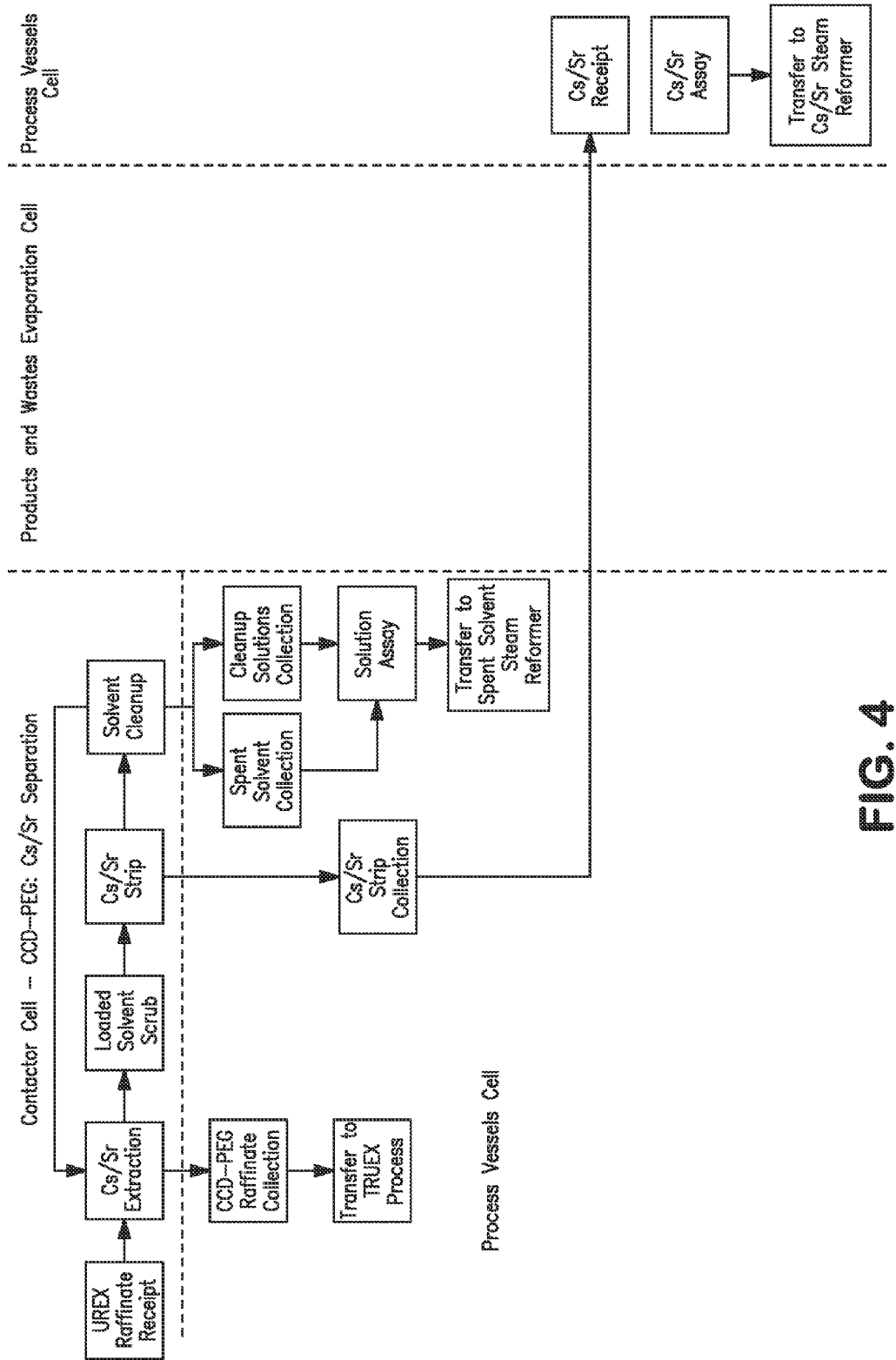
FIG. 4 depicts a functional flow diagram for the chlorinated cobalt dicarbollide polyethylene glycol (CCD-PEG) process.

FIG. 4 depicts a functional flow diagram for the chlorinated cobalt dicarbollide polyethylene glycol (CCD-PEG) process. The raffinate of the UREX process is fed to the extraction section of the CCD-PEG process. The CCD-PEG process is selective for cesium (Cs) and strontium (Sr) extraction for feeds containing less than 1M nitric acid. Alternatively, the Fission Product Extraction (FPEX) process, when sufficiently developed, could be used instead of the CCD-PEG process. The FPEX process is discussed in more detail below.

Cesium and strontium (as well as barium and rubidium) may be extracted by the CCD-PEG solvent, which is a mixture of 0.011 M chlorinated cobalt dicarbollide (CCD) and 0.027 M polyethylene glycol (PEG-400) in phenyl-trifluoromethyl sulfone (FS-13). Barium and rubidium are also quantitatively extracted by the solvent. In the scrub section, transuranics and lanthanides are removed from the solvent using 3 M nitric acid. The strip section uses 100 g/L guanidine (or methylamine carbonate) and 20 g/L DTPA to strip the cesium and strontium from the solvent. The guanidine forms a cation that replaces cesium (and rubidium) that was exchanged with the CCD. DTPA forms a complex with strontium (as well as barium and other +2 or +3 cations) and prevents the strontium from precipitating in the alkaline strip solution. A regenerable strip reagent, methylamine carbonate, has also been demonstrated, but further testing is needed to optimize the process. The solvent is then washed with 0.1 M nitric acid to remove impurities and acidify the solvent before recycling the solvent to the front end of the process. The cesium and strontium separated in the CCD-PEG process may be treated for disposal as waste.

Alternative FPEX Process for Cs/Sr Separation

An alternative process, FPEX, for separating Cs and Sr from the UREX raffinate is being developed. If successfully developed, the FPEX process could be substituted for the CCD-PEG process.

The FPEX process uses a solvent composed of 0.0075 M 4,4',(5')-Di(t-butyldicyclo-hexano)-18-crown-6 (DtBuCH18C6), 0.007 M Calix[4]arene-bis-(tertoctylbenzo-crown-6) (BOBCalixC6), 0.75 M 1-(2,2,3,3-tetrafluoropropoxy)-3-(4-sec-butylphenoxy)-2-propanol) (Cs-7SB), and 0.003 M trioctylamine (TOA) in Isopar® L. The strontium (Sr) and cesium (Cs) extractants are DtBuCH18C6 and BOBCalixC6, respectively. The modifier Cs-7SB enhances the extraction of Sr from the solvent mixture. Due to viscosity issues associated with the modifier, concentrations must be less than 0.8 M. TOA enhances the stripping of Cs from the solvent. Replacing the BOBCalixC6 and TOA with calix[4]arene-bis(2-ethylhexylbenzo-18-crown-6) (BEHBCalixC6) and a commercial guanidine reagent (LIX®79), respectively, to improve solvent performance has been evaluated.

The FPEX solvent mixture provides distribution coefficients useful for Cs and Sr extraction over a range of 0.5 M<[$HNO_3$]<2.5 M. Adjustment to the nitric acid concentration in the feed to the FPEX process may be needed depending on the configuration of the FPEX process in the overall fuel recycling facility. A third phase forms in the FPEX solvent at acid concentrations greater than 3 M, and therefore should generally be avoided. Additionally, the Cs and Sr distribution coefficients in the FPEX solvent are temperature dependent, increasing with reduced temperature as measured over the range of 10° C. to 20° C.

While the FPEX solvent has a very low affinity for transuranics or lanthanides, scrubbing of the solvent with nitric acid is conducted to remove the small amount of these radionuclides that are co-extracted. The concentration of the nitric acid used for scrubbing the FPEX solvent is 1 M nitric acid solution, which should provide adequate distribution ratios to prevent stripping of Cs and Sr. Stripping of Cs and Sr from the solvent is accomplished using 0.01 M $HNO_3$.

TRUEX Feed Adjustment

The transuranics and mixed fission products separated during the CCD-PEG process contain a reductant/complexant (such as AHA) that may interfere with transuranic separations in the TRUEX process. Therefore, between the CCD-PEG and the TRUEX processes is a feed adjustment step to (1) thermally destroy AHA added in the UREX process to suppress extraction of plutonium and neptunium, (2) increase the concentration of nitric acid, and (3) convert and maintain plutonium and neptunium in the (IV) extractible oxidation state.

The assumed conditions for the feed adjustment step are to add an oxidizing agent at 0.1 M, increase the nitric acid concentration from nominally 0.7 M to 2 M, and heat the CCD-PEG raffinate solution from 25° C. to 65° C. The residence time in the feed adjustment vessel is assumed to be approximately 4 hours to ensure destruction of the AHA complexant. AHA is known to slowly decompose in 0.3 M nitric acid at ambient temperature. Approximately 68 percent of the AHA decomposed (i.e., AHA concentration reduced from 0.47 M to 0.15 M) after 36-hour contact with 0.3 M nitric acid during the UREX process demonstration with Dresden-1 reactor fuel solution. Increasing the temperature of the UREX raffinate from 25° C. to 65° C. should accelerate the decomposition rate of AHA, thus reducing the decomposition time. An oxidizing agent, such as hydrazine, hydrogen peroxide, or sodium permanganate, may be added during the feed adjustment step.

1 to 3 M nitric acid solution may be used for the extraction of the transuranics (as neutral nitrate complexes) by the TRUEX solvent. The nitric acid concentration of the CCD-PEG raffinate is nominally 0.74 M. Therefore, addition of concentrated nitric acid to the CCD-PEG raffinate may be used for transuranics extraction in the TRUEX process.

TRUEX Process: Transuranics+Lanthanide Separation

Figure 5:
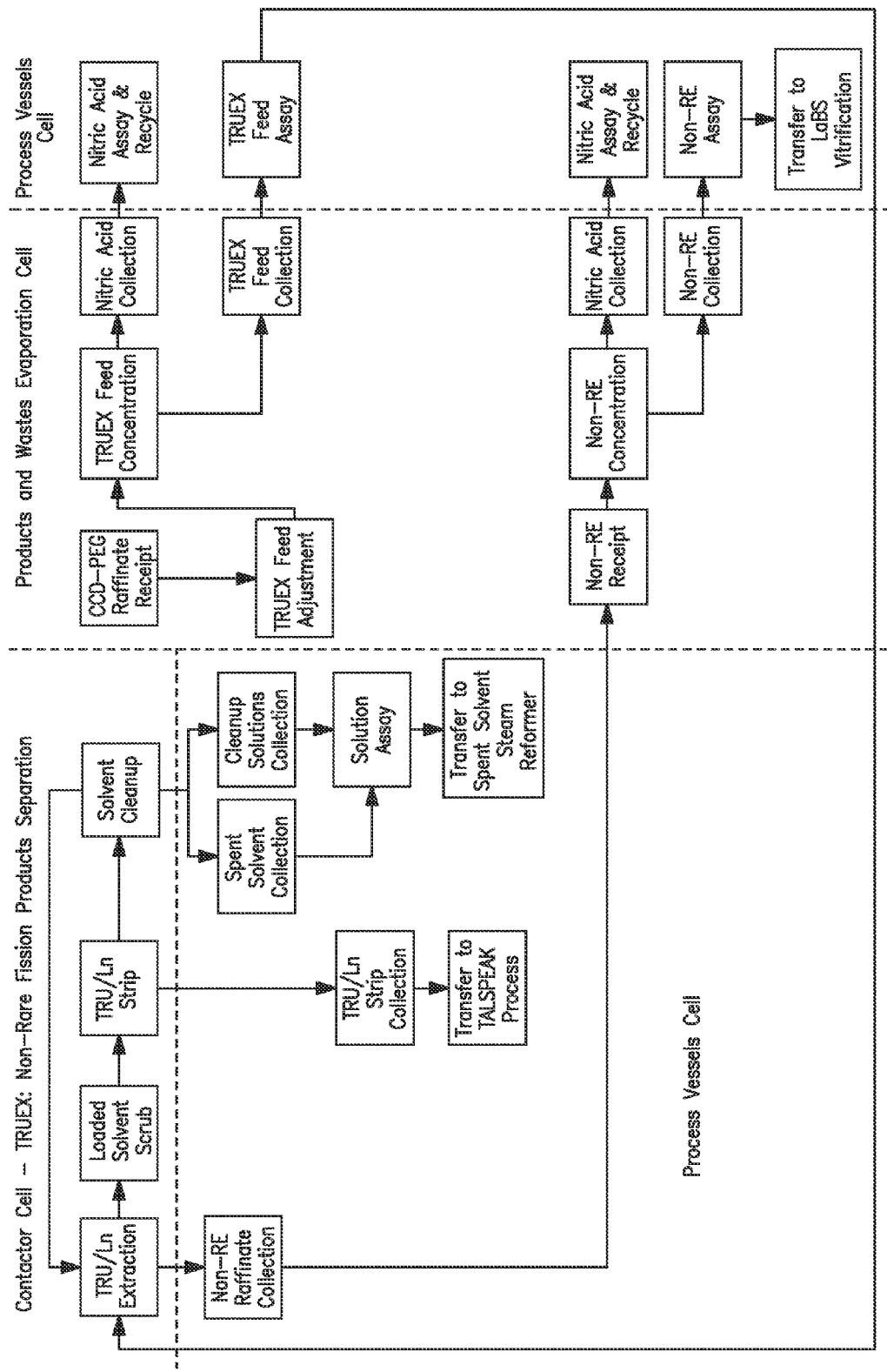
FIG. 5 depicts a functional flow diagram for the TRUEX feed adjustment and TRUEX process.

After adjustment, the raffinate of the CCD-PEG (or FPEX) process is fed to the extraction section of the TRUEX process. A functional flow diagram for the TRUEX feed adjustment and TRUEX process is depicted in FIG. 5.

The transuranics and the rare earth elements are extracted by the TRUEX solvent, which may be 0.2 M CMPO and 1.4 M TBP (phase modifier to prevent third phase formation) diluted by n-dodecane. Lesser amounts of other fission products (e.g., $Zr^{95}$ and $Y^{90}$) are also extracted and are scrubbed from the solvent. The TRUEX flow sheet may have three scrub sections. In the first scrub section, the impurities are removed from the solvent using oxalic acid (0.1M) mixed with nitric acid (0.1M). The second scrub section uses moderately concentrated (4M) nitric acid to scrub oxalic acid from the solvent. The third scrub section uses relatively dilute nitric acid (0.1M) to lower the nitric acid concentration in the solvent to allow effective stripping. The strip section uses a weak complexant salt (1M lactic acid with 0.1M DTPA) to strip the transuranics and rare earth (i.e. lanthanides) elements from the solvent. The solvent is then washed with 0.25 M sodium carbonate solution to remove degradation products and contacted with 0.1 M nitric acid to acidify the solvent before recycling the solvent to the front end of the process.

The non-rare earth elements separated from the transuranics and lanthanides may be treated for disposal as waste.

TALSPEAK: TRU Separation from Lanthanides

Figure 6:
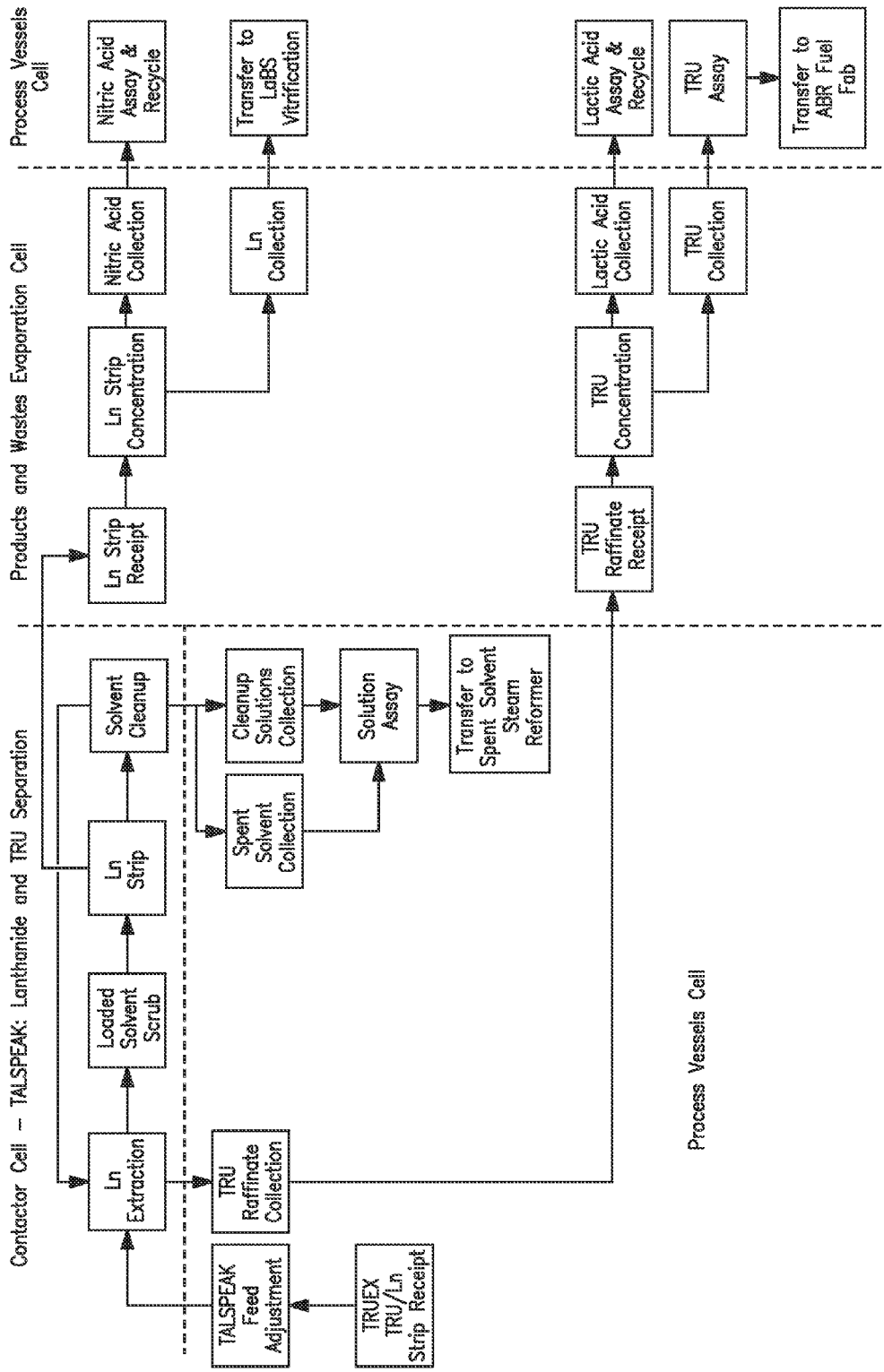
FIG. 6 depicts a functional flow diagram for the TALSPEAK process.

A functional flow diagram for the TALSPEAK process is depicted in FIG. 6. The feed to the TALSPEAK process is the TRUEX strip stream containing the transuranics and rare earth fission products in lactic acid and DPTA. The feed is first adjusted to pH 2 to 3 using, for example, ammonium hydroxide and nitric acid solutions to optimize rare earth extraction and minimize transuranics extraction in the TALSPEAK process.

The TALSPEAK process involves the extraction of +3 lanthanides (i.e., rare earth) cations by bis-(2-ethylhexyl) phosphoric acid (HDEHP) in n-dodecane from pH 2 to 3 aqueous phases containing 1 M lactic acid and 0.1 M diethylenetriaminepentaacetic acid (DTPA). The separation is based on the extraction of the 1:1 metal to lactate complexes and the stronger interaction of the +3 transuranics with the nitrogen donors of DTPA. After extraction, the solvent is scrubbed with a solution of 1 M lactic acid and 0.1 M DTPA to remove transuranics. The lanthanides are stripped from the solvent using 4 M nitric acid solution. Solvent is then washed with 1 M ammonium carbonate solution. The lanthanide nitric acid solution may be treated and disposed as waste. The transuranics separated in the TALSPEAK process are contained in a DTPA and lactic acid mixture and may be processed further to obtained desired end products.

Dissolution of TRU Containing TRIZO-Coated Fuels

As with the uranium containing TRIZO-coated fuels, the size-reduced fuel kernels containing TRU oxides are leached using an acidic solution such as nitric acid or nitric acid mixed with hydrofluoric acid to dissolve the fuel. Zirconium present in the fuel coatings will dissolve in the acid solution along with the fuel. The pyrolytic carbon and silicon carbide coatings, along with carbon fines and noble metals (e.g. rhodium, palladium, etc.) that do not dissolve in the nitric acid or nitric acid mixed with hydrofluoric acid, are separated from the dissolver solution by filtration.

The organic acids present in the clarified dissolver solution are then decomposed as discussed above. Since uranium content of the TRIZO-coated TRU oxide fuel is very low (less than 0.2 wt %), complexing of zirconium with fluoride may not be needed. The dissolver feeds are reacted with a reductant/complexant (AHA) to reduce the valence state and limit the extractability of plutonium and neptunium. The solution is then fed to a modified UREX+1a solvent extraction process, known as ZrTcEX, which is described below.

Modified UREX+1a Process for TRU Solutions

The preconditioned dissolver feeds are reacted with AHA to complex/reduce plutonium and neptunium, thereby limiting their extraction by tributyl phosphate in tributyl phosphate. The solution is then fed to the modified UREX+1a solvent extraction process, that is, the ZrTcEX process.

The modified UREX+1a process includes a zirconium (Zr) and technetium (Tc) solvent extraction process (ZrTcEX). The modified UREX+1a process may be utilized for: recovery of $^{137}$Cs and $^{90}$Sr fission products (CCD-PEG or FPEX), transuranics and rare earths separation from non-rare-earth (TRUEX), and separation of transuranic elements from the rare earths (TALSPEAK).

In the UREX process, acetohydroxamic acid (AHA) is added to the feed to the extraction section and in the scrub section to suppress plutonium extraction and hinder the retention of certain problematic fission products (e.g., Mo, Zr, and Ru) by the TBP solvent that would otherwise contaminate the uranium and technetium product streams. For the ZrTcEX process, AHA may be added to the feed to the extraction section and in the scrub section to suppress the plutonium extraction process. The TRIZO-coated TRU oxide fuel may also be processed in accordance with the uranium containing TRIZO-coated fuels as described above.

ZrTcEX: Uranium and Technetium Separation

Figure 7:
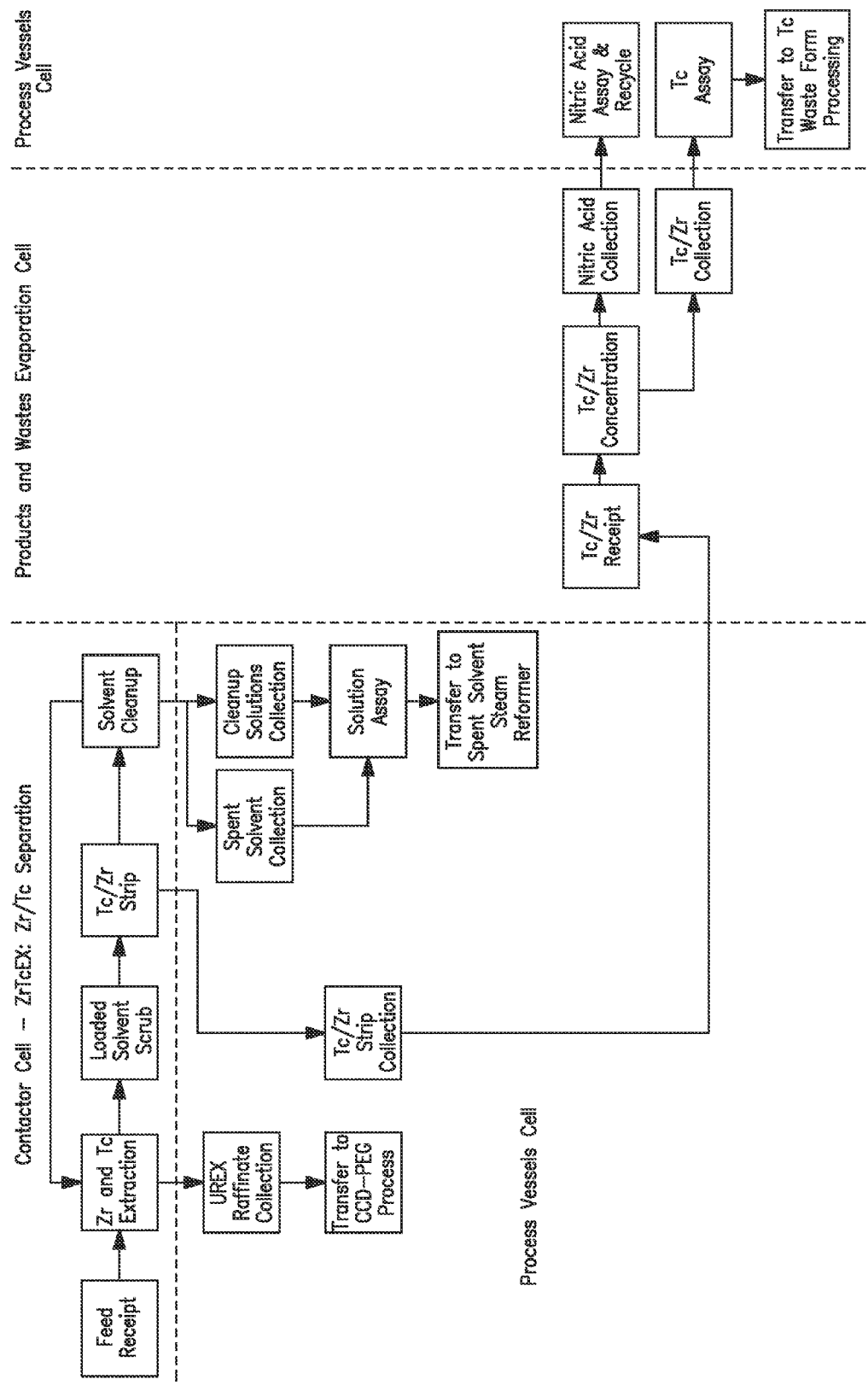
FIG. 7 depicts a functional flow diagram for the ZrTcEX process.

A functional flow diagram for the ZrTcEX process is depicted in FIG. 7. The ZrTcEX process separates the transuranics and mixed fission products from zirconium, technetium, and small amounts of uranium present in the dissolved SNF. Technetium, zirconium, and the small amount of uranium are subsequently stripped from the solvent for disposal. The transuranics and mixed fission products are then fed to the CCD-PEG (or FPEX) process for further treatment, as described above.

The zirconium and technetium (and the small amount of uranium) in the feed are extracted into the solvent in the extraction section; other extractible species are scrubbed from the solvent in the scrub section.

The solvent for the ZrTcEX process is tributyl phosphate (TBP) dissolved in n-dodecane. A reductant/complexant (such as 0.47 M AHA and 0.3 M HNO3) is added to the process through the scrub to limit the extractability of plutonium and neptunium. The feed and the scrub contain low concentrations of nitric acid to enhance the complexation of Pu and Np and to increase the extractability of pertechnetate ion.

When processing uranium fuels, TBP is normally loaded extensively with uranium (or Pu (IV)), which suppresses zirconium extraction. However in the absence of high uranium concentration, the TBP solvent in the ZrTcEX process will co-extract zirconium and technetium. Technetium (VII) is strongly co-extracted with zirconium (IV) by TBP due to the formation of the $Zr(TcO_4)(NO_3)_2(TBP)_2$. The distribution coefficient (D) for zirconium and technetium complex in 30% TBP is reported as ~1.2 in 3.25M and ~1.4 in 4.8M nitric acid at 55° C., when uranium is absent and zirconium is less than 0.017M The distribution coefficient for technetium ($D_{Tc}$) in 30% TBP increases significantly as the concentration of free zirconium increases in the organic phase, with decreasing nitric acid concentration in the aqueous phase, and with decreasing temperature in accordance with the following relationship:

$$D_{Tc} = {}^0D_{Tc} + K_{Tc,U}C_{U,f}*(1+k[NO_3]^{-i}) + K_{TcZr}C_{Zr,f}*[NO_3]^{-j} \quad \text{(equation 1)}$$

Where;
$i = 1.343$
$j = 0.707$
$k = 4.87e^{980\Delta T}$
$K_{Tc,U}C_{U,f} = 0.331e^{-1060\Delta T}$
$K_{TcZr}C_{Zr,f} = 1670e^{2810\Delta T}$
$\Delta T = [1/(273+t° C.)] - [1/298]$
${}^0D_{Tc}$ is the distribution ratio of Tc in TBP
$K_{Tc,U}C_{U,f}*(1+k[NO_3]^{-i})$ is the distribution ratio of the U-Tc complex in TBP
$K_{TcZr}C_{Zr,f}*[NO_3]^{-j}$ is the distribution ratio of the Zr-Tc complexes in TBP
$C_{U,f}$ is the organic phase concentration of free uranium
$C_{Zr,f}$ is the organic phase concentration of free zirconium Equation 1 can be simplified to equation 2 in the absence of uranium.

$$D_{Tc} = {}^0D_{Tc} + K_{TcZr}C_{Zr,f}*[NO_3]^{-j} \quad \text{(equation 2)}$$

The distribution ratio of Tc in TBP (${}^0D_{Tc}$) can then be calculated from equation 2 at 55° C., since $D_{Tc}$ is equal to 1.2 at 3.25M $NO_3$.

$$1.2 = {}^0D_{Tc} + 1670 e^{2810\Delta T}*[3.25]^{-0.707}$$

$$\Delta T = [1/(273+55° C.)] - [1/298]$$

$$\Delta T = -3.069e\text{-}04$$

$$1.2 = {}^0D_{Tc} + 1670*(0.4221)*0.4346$$

$${}^0D_{Tc} = -305.18$$

The technetium distribution coefficient ($D_{Tc}$) in 30% TBP can be corrected from 55° C. to 25° C. using equation 2 and the calculated value for ${}^0D_{TC}$, assuming the organic phase concentration of zirconium does not significantly change with the reduced temperature.

$$D_{Tc} = -305.18 + K_{TcZr}C_{Zr,f}*[NO_3]^{-j} \quad \text{(equation 3)}$$

$$D_{Tc} = -305.18 + 1670 \, e^{2810\Delta T}*[3.25]^{-0.707}$$

$$\Delta T = [1/(273+25° C.)] - [1/298]$$

$$\Delta T = 0$$

$$D_{Tc} = -305.18 + 1670*[3.25]^{-0.707}$$

$$D_{Tc} \approx 420 \text{ at } 25° C.$$

In one embodiment, a distribution coefficient of 420 at 25° C. is favorable to extracting technetium into TBP.

The solvent, now loaded with zirconium, technetium and a small amount of uranium, is stripped using 6 M nitric acid. The technetium, zirconium, and uranium waste stream can be treated for disposal. The solvent is then washed with 0.25 M sodium carbonate solution to remove degradation products and contacted with 0.1 M nitric acid to acidify the solvent before recycling the solvent to the front end of the process.

However, there may be insufficient technetium present to complex all of the zirconium. Excess zirconium is complexed with AHA that is added in the feed and scrub sections of the UREX process and exists with the other fission products and actinides for processing in the CCD-PEG (or FPEX), TRUEX, and TALSPEAK processes. Therefore, after the AHA is decomposed, fluoride may be added in the TRUEX feed adjustment step to complex zirconium and prevent co-extraction with the transuranics and lanthanides. If HF was used, as described above, then this step may not be required. The other steps of the CCD-PEG (or FPEX), TRUEX, and TALSPEAK processes may be conducted as previously described.

The processes described above may apply to the processing of uranium (U), U and plutonium (Pu), Pu and/or TRU oxide mixtures or other fissile material mixtures (e.g. thorium (Th)) containing Zr and fission products, for purposes of recovering U, Pu, and possibly other elements in states that are useful for fuel but not for weapons. The processes may also apply to such mixtures containing carbonaceous materials. Examples of such mixtures are TRISO fuel, TRIZO fuel, fuels with Zr cladding, and carbide fuels. Examples of such processes are the UREX family of aqueous separations processes, including UREX+1a, PUREX-NPC™, and the pyro-metallurgical processes.

In particular, the processes described above are described in the context of the UREX+1a aqueous separations process train, which is designed for common spent light water reactor fuel that does not contain Zr or carbon.

The processing methods may also be applied to alternative aqueous separation processes, including those in the UREX+ family of processes invented at US DOE laboratories and the PUREX-NPC™ process as described in co-pending U.S. application Ser. No. 11/851,932, filed Sep. 7, 2007, which is incorporated herein by reference in its entirety. The alternative processes are designed to yield different products for reuse as fuel and different by-product wastes, such as fission products for disposal, but the processing methods described herein may be applied.

The ZrTcEX process may also be applied in the preparation of Zr-containing mixtures for pyro-metallurgical processing. In such pyro-metallurgical processing, the oxides of TRU elements are typically reduced to metallic form, electrorefined, and further purified in a crucible melter. Since the Zr would report to the final TRU product in reduced levels that may compromise performance as a fuel, the Zr can first be removed. In this case, the spent fuel dissolution, the organic acid oxidation, and the ZrTcEX steps could be applied prior to pyro-processing.

The processes described herein are described in terms of processing spent nuclear fuel. In addition to spent nuclear fuel, the processes described herein may also be applied to, for example, recovery from unused fuel, recovery from intercepted weapons, and recovery from wastes. In methodologies directly or indirectly set forth herein, various steps and operations are described in one possible order of operation, but those skilled in the art will recognize that steps and operations may be rearranged, replaced, or eliminated or have other steps inserted without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method for processing TRIZO-coated fuel comprising:
    dissolving a fuel kernel containing zirconium, whereby the zirconium is dissolved and organic acids are formed, wherein the organic acids comprise oxalic acid and mellitic acid;
    separating solids from the dissolved fuel kernel;
    oxidizing the organic acids;
    complexing the dissolved zirconium with fluoride; and
    processing the dissolved fuel kernel using a solvent extraction process to separate fission products, including the zirconium, from uranium and transuranics.

2. The method of claim 1, wherein the solvent extraction process comprises a UREX$_+$1a process.

3. The method of claim 1, wherein the solvent extraction process comprises a UREX$_+$1a process including a ZrTcEX (zirconium technetium extraction) process.

4. A method for processing fissile material mixtures comprising:
    dissolving a fuel kernel of a fissile material mixture including at least one of zirconium and carbon, whereby the zirconium is dissolved and organic acids are formed, wherein the organic acids comprise oxalic acid and mellitic acid;
    separating solids from the dissolved fuel kernel;
    oxidizing the organic acids;
    complexing the dissolved zirconium with fluoride; and
    processing the dissolved fuel kernel using a solvent extraction process to separate fission products, including the zirconium, from uranium and transuranics.

5. The method of claim 4, wherein the fissile material mixtures comprises a TRIZO-coated fuel.

6. A method for separating transuranics from a TRIZO-coated spent fuel comprising:
    dissolving a fuel kernel containing zirconium, whereby the zirconium is dissolved and organic acids are formed, wherein the organic acids comprise oxalic acid and mellitic acid;
    separating solids from the dissolved fuel kernel;
    oxidizing the organic acids;
    extracting the zirconium from the dissolved fuel kernel; and
    processing the dissolved fuel kernel by at least one of the following processes: UREX (uranium extraction), ZrTcEX (zirconium technetium extraction), CCD-PEG (chlorinated cobalt dicarbollide polyethelene glycol), FPEX (fission product extraction), TRUEX (transuranic extraction), TALSPEAK (trivalent actinide lanthanide separations by phosphorous-reagent extraction from aqueous [K] complexes) and PUREX (plutonium uranium extraction).

7. A method for processing fissile material mixtures comprising:
    dissolving a fuel kernel of a fissile material mixture including at least one of zirconium and carbon, whereby the zirconium is dissolved and organic acids are formed, wherein the organic acids comprise oxalic acid and mellitic acid;
    separating solids from the dissolved fuel kernel;
    oxidizing the organic acids;
    extracting the zirconium from the dissolved fuel kernel; and
    processing the dissolved fuel kernel by at least one of the following processes: UREX (uranium extraction), ZrTcEX (zirconium technetium extraction), CCD-PEG (chlorinated cobalt dicarbollide polyethelene glycol), FPEX (fission product extraction), TRUEX (transuranic extraction), TALSPEAK (trivalent actinide lanthanide separations by phosphorous-reagent extraction from aqueous [K] complexes) and PUREX (plutonium uranium extraction).

8. The method of claim 7, wherein the fissile material mixtures comprises a TRIZO-coated fuel.

9. A method for processing TRIZO-coated fuel comprising:
dissolving a fuel kernel containing zirconium in a composition comprising HF and $HNO_3$, whereby the zirconium is dissolved and organic acids are formed, wherein the organic acids comprise oxalic acid and mellitic acid;
separating solids from the dissolved fuel kernel;
oxidizing the organic acids; and
processing the dissolved fuel kernel using a solvent extraction process to separate fission products, including the zirconium, from uranium and transuranics.

10. A method for processing fissile material mixtures comprising:
dissolving a fuel kernel of a fissile material mixture including at least one of zirconium and carbon in a composition comprising HF and HNO3, whereby the zirconium is dissolved and organic acids are formed, wherein the organic acids comprise oxalic acid and mellitic acid;
separating solids from the dissolved fuel kernel;
oxidizing the organic acids; and
processing the dissolved fuel kernel using a solvent extraction process to separate fission products, including the zirconium, from uranium and transuranics.

* * * * *